United States Patent [19]

Ikeda et al.

[11] Patent Number: 5,357,281
[45] Date of Patent: Oct. 18, 1994

[54] IMAGE PROCESSING APPARATUS AND TERMINAL APPARATUS

[75] Inventors: Keiichi Ikeda, Kawasaki; Hiroyuki Horii, Yokohama, both of Japan

[73] Assignee: Canon Kabushiki Kaisha, Tokyo, Japan

[21] Appl. No.: 970,782

[22] Filed: Nov. 3, 1992

[30] Foreign Application Priority Data

Nov. 7, 1991 [JP] Japan ................... 3-291719
Apr. 23, 1992 [JP] Japan ................... 4-104426
Jul. 8, 1992 [JP] Japan ................... 4-180790

[51] Int. Cl.⁵ .................... H04N 7/133; H04N 7/137
[52] U.S. Cl. ...................... 348/401; 368/17; 368/632; 348/15
[58] Field of Search ............... 358/133, 105, 85, 165, 358/210; 379/53; 348/17, 401, 402, 404, 632; H04N 7/133, 7/137

[56] References Cited

U.S. PATENT DOCUMENTS

| | | | |
|---|---|---|---|
| 4,888,795 | 12/1989 | Ando | 379/53 |
| 4,939,580 | 7/1990 | Ishikawa | 358/165 |
| 5,063,440 | 11/1991 | Hong | 379/53 |
| 5,164,828 | 11/1992 | Tahara | 358/85 |

*Primary Examiner*—Howard W. Britton
*Attorney, Agent, or Firm*—Fitzpatrick, Cella, Harper & Scinto

[57] ABSTRACT

The present invention is directed to a terminal apparatus in which the in-frame compression factor of an image obtained by a camera is increased to restrict frame thinning when the camera is moved. A control circuit 60 performs control of a movable table 12. When a TV camera 10 is moved, the quantization table used in a quantization circuit 26 is changed over, whereby a higher compression factor of the coding conducted by a DCT circuit 24 and the quantization circuit 26 is achieved. Thus, a predetermined compression factor can be achieved without performing frame thinning.

19 Claims, 8 Drawing Sheets

FIG. 2

| 5 | 4 | 7 | 5 | 6 | 3 | 5 | 7 |
|---|---|---|---|---|---|---|---|
| 7 | 20 | 26 | 54 | 58 | 70 | 68 | 70 |
| 19 | 22 | 30 | 60 | 66 | 80 | 81 | 90 |
| 30 | 31 | 40 | 70 | 71 | 90 | 87 | 98 |
| 50 | 56 | 68 | 71 | 82 | 93 | 91 | 102 |
| 55 | 58 | 81 | 94 | 108 | 114 | 151 | 128 |
| 60 | 67 | 90 | 110 | 120 | 140 | 160 | 182 |
| 80 | 88 | 99 | 118 | 131 | 147 | 171 | 190 |

FIG. 3

| 9 | 9 | 23 | 23 | 34 | 34 | 38 | 38 |
|---|---|---|---|---|---|---|---|
| 9 | 9 | 23 | 23 | 34 | 34 | 38 | 38 |
| 25 | 25 | 50 | 50 | 77 | 77 | 89 | 89 |
| 25 | 25 | 50 | 50 | 77 | 77 | 89 | 89 |
| 55 | 55 | 79 | 79 | 99 | 99 | 118 | 118 |
| 55 | 55 | 79 | 79 | 99 | 99 | 118 | 118 |
| 74 | 74 | 104 | 104 | 134 | 134 | 176 | 176 |
| 74 | 74 | 104 | 104 | 134 | 134 | 176 | 176 |

FIG. 4

| 27 | 27 | 27 | 27 | 59 | 59 | 59 | 59 |
|----|----|----|----|----|----|----|----|
| 27 | 27 | 27 | 27 | 59 | 59 | 59 | 59 |
| 27 | 27 | 27 | 27 | 59 | 59 | 59 | 59 |
| 27 | 27 | 27 | 27 | 59 | 59 | 59 | 59 |
| 78 | 78 | 78 | 78 | 132 | 132 | 132 | 132 |
| 78 | 78 | 78 | 78 | 132 | 132 | 132 | 132 |
| 78 | 78 | 78 | 78 | 132 | 132 | 132 | 132 |
| 78 | 78 | 78 | 78 | 132 | 132 | 132 | 132 |

FIG.6

$$Qij = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

FIG.7

$$Qij = \begin{bmatrix} 30 & 22 & 19 & 29 & 50 & 83 & 106 & 126 \\ 23 & 23 & 26 & 39 & 54 & 117 & 123 & 114 \\ 27 & 25 & 32 & 49 & 81 & 115 & 141 & 115 \\ 27 & 35 & 44 & 58 & 102 & 175 & 162 & 126 \\ 38 & 46 & 75 & 112 & 136 & 219 & 207 & 156 \\ 51 & 72 & 112 & 129 & 163 & 208 & 227 & 185 \\ 101 & 131 & 158 & 176 & 207 & 243 & 240 & 203 \\ 148 & 187 & 193 & 198 & 226 & 201 & 207 & 201 \end{bmatrix}$$

IMAGE PROCESSING APPARATUS AND TERMINAL APPARATUS

BACKGROUND OF THE INVENTION

1. Field of the Invention

The present invention relates to an image processing apparatus and a terminal apparatus suitable for use in video conference or video phone system.

2. Related Background Art

Video phone systems and video conference systems which implement the telephone or conference function over remote sites utilizing images and speech transmitted between these sites via a leased or public digital telecommunication line are known. In such systems, the usable capacity of the telecommunication line is limited, and moving images are thus high efficiency compression coded for transmission. There are two types of bandwith compression for image data: in-frame compression and interframe compression. In in-frame compression, the data is compressed by means of the linear transformation, for example, discrete cosine transformation (DCT) by utilizing the correlation of adjacent pixels in a single frame. In interframe compression, the correlation between the pixels at the same position on the screens of consecutive frames is utilized, and data is compressed by replacing the present pixel data with the pixel data of the past frame on which coding has been already conducted.

A high compression factor can be achieved when both in-frame compression and interframe compression are used. Interframe compression is characterized in that the frame-to-frame correlation weakens in a rapidly moving image, thus rapidly reducing the compression factor thereof. Therefore, in a rapidly moving image, only in-frame compression is used. However, the use of in-frame compression alone is not generally enough to achieve a predetermined compression factor suitable to the capacity of the telecommunication line, and frame thinning is thus performed.

In the video phone system, there have been no such demands for thinning frames so far. However, in the conventional video conference system, it has been proposed to change the direction of a TV camera so that it can follow a participant or speaker as the participant or speaker moves in accordance with the image processing process or speech. It has also been proposed to control the position, direction or zooming of the TV camera from the operation panel on the image transmission side and/or image reception side.

In such cases, the compression factor of the interframe compression operation greatly deteriorates during the movement of the TV camera, resulting in an increase in the amount of codes. As a result, frame thinning is performed for the aforementioned reasons, and an awkwardly moving image is thus displayed on the display screen of the reception side. Also, when the TV camera on the transmission side is operated from the operation panel on the reception side, a time delay that cannot be ignored occurs between the movement of the TV camera and the image displayed on the reception side, making the positioning of the TV camera difficult.

SUMMARY OF THE INVENTION

An object of the present invention is to provide an image processing apparatus which is capable of overcoming the aforementioned problems of the conventional techniques.

Another object of the present invention is to provide a terminal apparatus which is capable of overcoming the aforementioned problems of the conventional techniques.

Still another object of the present invention is to provide a video phone system or video conference system which is capable of overcoming the aforementioned problems of the conventional techniques.

To achieve the aforementioned objects, in a preferred form of the present invention, there is provided an apparatus which comprises video input means including a movable camera, and coding means for in-frame and interframe coding an image signal input by the video input means. In the coding means, a compression factor of the in-frame coding is increased when the camera is moved.

Still another object of the present invention is to provide an improvement in the image quality of a multimedia processing apparatus for processing both image data and voice (i.e. audio) data.

Still another object of the present invention is to provide an image processing apparatus in which block coding is performed and which enables block distortion to be reduced to improve the image quality.

Other objects and advantages of the present invention will become apparent from the following description taken in connection with the accompanying drawings.

BRIEF DESCRIPTION OF THE DRAWINGS

FIG. 2 illustrates an example of original image data;

FIG. 3 illustrates an averaging example in which image data is averaged in a region consisting of 2×2 pixels;

FIG. 4 illustrates an averaging example in which image data is averaged in a region consisting of 4×4 pixels;

FIG. 6 illustrates an example of a normally employed coding and quantization table for a luminance signal;

FIG. 7 illustrates an example of a coding and quantization table which is used when a camera is used;

DETAILED DESCRIPTION OF THE PREFERRED EMBODIMENTS

Embodiments of the present invention will now be described with reference to the accompanying drawings.

Figure 1:
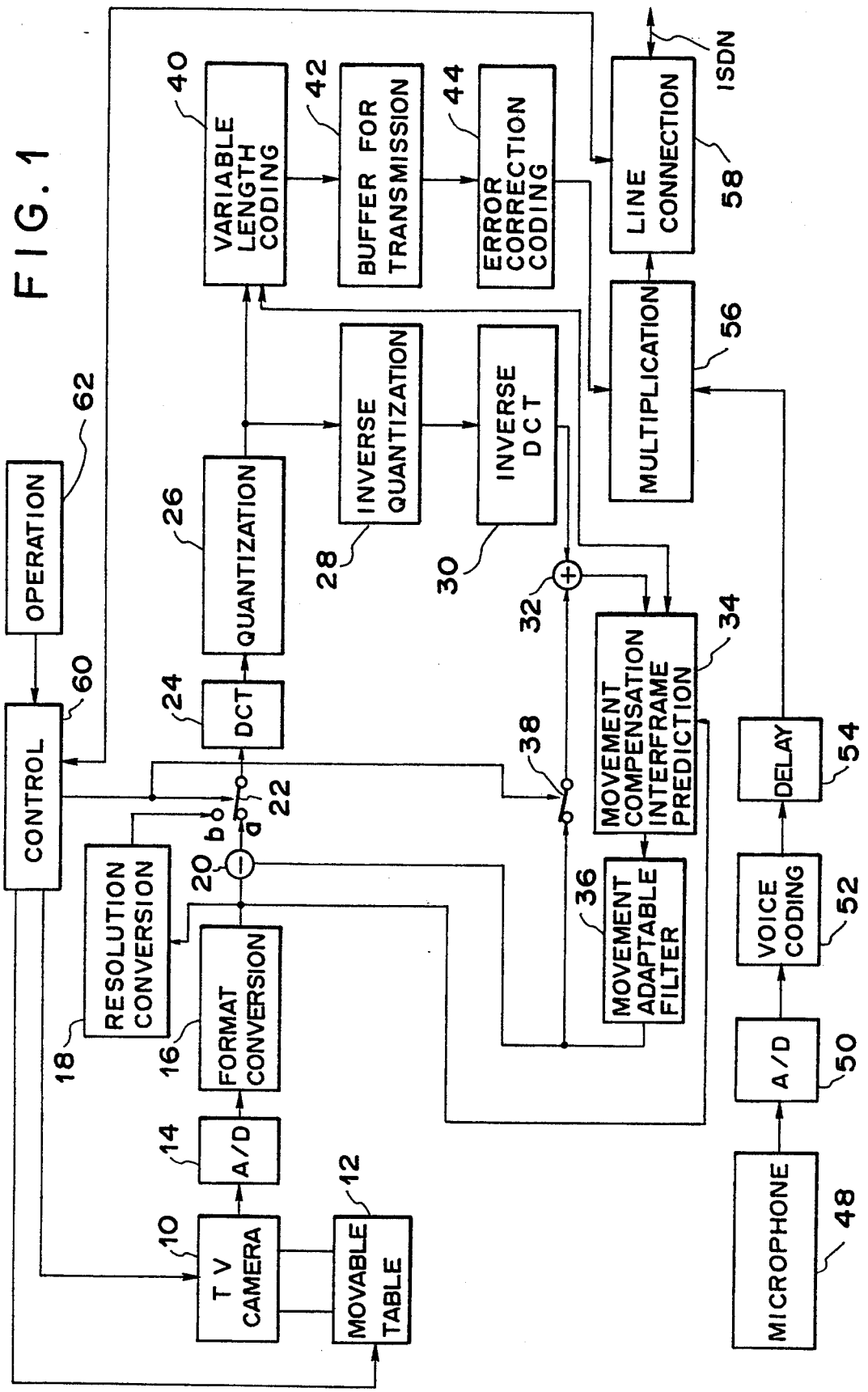
FIG. 1 is a block diagram of a first embodiment of the present invention.

FIG. 1 is a block diagram of a terminal apparatus illustrating a first embodiment of the present invention. Only the transmission system of the terminal apparatus is shown in FIG. 1.

In the terminal apparatus shown in FIG. 1, a TV camera 10 converts the images of video conference participants into an electrical signal. The position and direction of the TV camera 10 are changed by a movable table 12. An A/D converter 14 converts the image output from the TV camera 10 into a digital signal. A format converting circuit 16 converts the output of the A/D converter 14 which is of the raster type into a signal having the intermediate format for transmission, such as CIF (Common Intermediate Format) or QCIF (Quarter CIF). A resolution converting circuit 18 converts the output of the format converting circuit 16 into a signal having a low resolution.

A subtracter 20 subtracts the predicted value in the predictive coding method from the output of the format converting circuit 16. A switch 22 selects either the output of the subtracter 20 (a contact 'a') or the output of the resolution converting circuit 18 (a contact 'b'). The switch 22 is normally connected to the contact 'a'. The switch 22 is changed over to the contact 'b' when it is difficult to perform interframe compression, for example, when the TV camera 10 is moved. A DCT circuit 24 DCT transforms the output of the switch 22 in the units of a block consisting of 8×8 pixels. A quantization circuit 26 quantizes the coefficients of transform of the DCT circuit 24.

An inverse quantization circuit 28 inversely quantizes the output of the quantization circuit 26. An inverse DCT circuit 24 inversely DCT transforms the output of the inverse quantization circuit 28. An adder 32 adds, to the output of the inverse DCT circuit 30, the predicted value in a normal operation or '0' when the TV camera 10 is moved. A movement compensation interframe prediction circuit 34 detects a motion vector from both the output (present frame) of the format converting circuit 16 and the output (the previous frame) of the adder 32, and calculates the predicted value by movement compensation interframe prediction. A movement adaptable filter 36 is a low-pass filter which removes the high-frequency area of the predicted value obtained by the movement compensation interframe prediction circuit 34. The output of the movement adaptable filter 36 is applied, as the predicted value, to the subtracter 20 and, through a switch 38, to the adder 32. The switch 38 is normally closed. The switch 38 is opened when the TV camera is moved.

In a state where the switch 22 is connected to contact 'a' and where the switch 38 is closed, the circuits 20, 22, 24, 26, 28, 30, 32, 34, and 36 function as the predictive differential coding circuit which employs the previous frame value as the predicted value to perform in-frame and interframe compressions.

A variable length coding circuit 40 variable length codes the output of the quantization circuit 26 and the motion vector supplied from the movement compensation interframe prediction circuit 34. A buffer 42 for transmission adjusts the rate of the output of the circuit 40, and thins out the frames when necessary. An error correction coding circuit 44 affixes an error correcting code to the output of the transmission buffer 42.

A voice is input from a microphone 48. An A/D converter 50 converts the output of the microphone 48 into a digital signal. A voice coding circuit 52 compresses and encodes the output of the A/D converter 50. A delay circuit 54 delays the output of the voice coding circuit 54 by a time corresponding to the time it takes for the image output from the TV camera 10 to be processed.

A multiplication circuit 56 multiplies the output of the error correction coding circuit 44 and the output of the delay circuit 54. A line connection circuit 58, which may be a terminal adapter, provides connection to the telecommunication line, such as ISDN. In this embodiment, the line connection circuit 58 outputs the output of the multiplication circuit 56 to the telecommunication line. A control circuit 60 controls the aperture of the TV camera 10 and zooming of the photographic lens. The control circuit 60 also controls the movable table 12 and the switches 22 and 38. Various instructions are input to the control circuit 60 from an operation device 62.

First, the operation when the TV camera 10 is stationary or substantially stationary will be described below. At that time, the control circuit 60 connects the switch 22 to contact 'a', and closes the switch 38. The video signal output from the TV camera 10 is converted into a digital signal by the A/D converter 14, and the output of the A/D converter 14, having the raster format, is converted into a signal having a predetermined intermediate format for transmission by the format converting circuit 16. The output of the format converting circuit 16 is applied to the resolution converting circuit 18, the subtracter 20 and the movement compensation interframe prediction circuit 36. Since the switch is connected to contact 'a', the resolution converting circuit 18 is not utilized.

The subtracter 20 subtracts the predicted value (the output of the movement adaptable filter 38), and the calculates an error signal for predictive differential encoding method. The output of the subtracter 20 is applied to the DCT circuit 24 through the switch 22. The DCT circuit 24 performs DCT transform in every block consisting of 8×8 pixels, and outputs a coefficient of transform. The coefficient of transform is quantized by the quantization circuit 26.

The inverse quantization circuit 28 inversely quantizes the output of the quantization circuit 26, and the inverse DCT circuit 30 inversely DCT transforms the output of the inverse quantization circuit 28. The adder 32 adds the predicted value to the output of the inverse DCT circuit 30. The output of the adder 32 is a locally decoded value obtained by predictive differential encoding the output of the format converting circuit 16 and then by decoding the predictive differential coded value. The movement compensation interframe prediction circuit 34 calculates a motion vector from both the present value (the present frame) supplied from the format coverting circuit 16 and the locally decoded value (the previous frame) supplied from the adder 32, and calculates the predicted value of the present frame by the movement compensation interframe prediction process. The calculated motion vector is applied to the variable length coding circuit 40, and the predicted value is applied to the movement adaptable filter 36. The movement adaptable filter 36 removes a predetermined high-frequency component from the predicted value, and applies the obtained value to the subtracter 20 and, through the switch 38, to the adder 32.

The circuits 20 through 38 constitute the predictive differential coding circuit which performs interframe and in-frame compression of the image data. The image data compressed by the circuits 20 through 38 is applied from the quantization circuit 26 to the variable length coding circuit 40.

The variable length coding circuit 40 performs variable length coding and in-frame compression on the output of the quantization circuit 26 and the motion vector supplied from the movement compensation interframe prediction circuit 34. The output of the variable length coding circuit 40 is applied to the error correction coding circuit 44 through the buffer 42 for transmission. The error correction coding circuit 44 generates an error correction code, and applies the generated code to the multiplication circuit 56.

The voice signal picked up by the microphone 48 is converted into a digital signal by the A/D converter 50, and the digital signal is coded by the voice coding circuit 52. The delay circuit 54 delays the output of the voice coding circuit 52 by a time corresponding to the time it takes for the video signal to be processed in the aforementioned manner.

The multiplication circuit 56 multiplies the data supplied from the error correction coding circuit 44 and the data supplied from the delay circuit 54. The output of the multiplication circuit 56 is output to the telecommunication line through the line connection circuit 58.

Next, the operation of the terminal apparatus shown in FIG. 1 when the TV camera 10 is in motion will be explained. When the TV camera 10 is moved, the control circuit 60 connects the switch 22 to contact 'b', and opens the switch 38. Since the switch 22 is connected to contact 'b', the resolution converting circuit 18 functions. Also, since the switch 38 is opened, the circuits 24 through 36 perform in-frame compression by DCT and detection of the motion vector.

The video signal output from the TV camera 10 is converted into a digital signal by the A/D converter 14, and the output of the A/D converter 14, having the raster format, is converted into a signal having a predetermined intermediate format for transmission by the format converting circuit 16. The output of the format converting circuit 16 is applied to the resolution converting circuit 18, the subtracter 20 and the movement compensation interframe prediction circuit 36.

The resolution converting circuit 18 averages the data block consisting of 8×8 pixels in every region consisting of 2×2 pixels. When the original image data block is such as that shown in FIG. 2, the resolution converting circuit 18 forms and outputs the image data block which is averaged in every region consisting of 2×2 pixels, as shown in FIG. 3. When it is desired to increase the compression factor, an image data block averaged in every region consisting of 4×4 pixels may be formed, as shown in FIG. 4.

The image data whose resolution has been reduced by the resolution converting circuit 18 is applied to the DCT circuit 24 through the switch 22. The DCT circuit 24 performs DCT transform in every block consisting of 8×8 pixels, and outputs the coefficient of transform, and the quantization circuit 26 quantizes the coefficient of transform. When the TV camera is moved, since the resolution of the image data, which is to be DCT transformed by the DCT circuit 24, is reduced, the compression factor of the coding performed by the DCT circuit 24 and the quantization circuit 26 increases.

The inverse quantization circuit 28 inversely quantizes the output of the quantization circuit 26, and the inverse DCT circuit 30 inversely DCT transforms the output of the inverse quantization circuit 28. The adder 32 outputs the output of the inverse DCT circuit 30 without changes, because the switch 38 is open. The output of the adder 32 is a locally decoded value of the code coded by the DCT circuit 24 and the quantization circuit 26. The movement compensation interframe prediction circuit 34 calculates a motion vector from both the present value (the present frame) supplied from the format converting circuit 16 and the locally decoded value (the previous frame) supplied from the adder 32, and calculates the predicted value of the present frame by the movement compensation interframe prediction process. Here the predicted value is not utilized. The calculated motion vector is applied to the variable length coding circuit 40.

The image data which has been converted into data having a lower resolution by the resolution converting circuit 18 is in-frame compressed by the DCT circuit 24 and the quantization circuit 26. The thus-compressed image data is applied from the quantization circuit 26 to the variable length coding circuit 40.

The variable length coding circuit 40 performs variable length coding and hence in-frame compression on the output of the quantization circuit 26 and the motion vector supplied from the movement compensation interframe prediction circuit 34. The output of the variable length coding circuit 40 is applied to the error correction coding circuit 44 through the buffer 42 for transmission. When the amount of data for transmission is too large as compared with the capacity of the telecommunication line, the buffer 42 for transmission performs frame thinning. In an image, particularly, in a moving image, on which frame thinning is performed, the motion of the image becomes awkward, and the image quality deteriorates. The error correction coding circuit 44 generates an error correction code, and applies the generated code to the multiplication circuit 56.

The voice signal picked up by the microphone 48 is processed by the A/D converter 50 and the voice coding circuit 52 in the same manner as that when the TV camera 10 is stationary, and the processed signal is time adjusted by the delay circuit 54. The output of the delay circuit 54 is supplied to the multiplication circuit 56.

The multiplication circuit 56 multiplies the data supplied from the error correction coding circuit 44 and the data supplied from the delay circuit 54. The output of the multiplication circuit 56 is output to the telecommunication line through the line connection circuit 58.

Thus, when the TV camera is moved, since the image data whose resolution has been reduced by the resolution converting circuit 18 is compression coded by the DCT circuit 24 and the quantization circuit 26, the compression factor of the DCT circuit 24 and the quantization circuit increases. Consequently, a predetermined compression factor can be achieved without performing frame thinning.

In the above-mentioned embodiment, the resolution conversion circuit 18 executes averaging on a region consisting of 2×2 pixels or 4×4 pixels. However, the resolution conversion circuit 18 may also be arranged such that it replaces a pixel value with a predetermined (for example, the left upper value) another pixel value. This method ensures a shorter processing time and simplification of the circuit configuration.

Furthermore, a change in the resolution may be achieved by changing over the intermediate format for transmission which is employed in the format conversion circuit 16 depending on the operation mode. For example, the format conversion circuit 16 may be arranged in that it employs the CIF format having a high resolution of 352×288 pixels when the TV camera 10 is stationary or substantially stationary and the QCIF format having a relatively low resolution of 176×144 pixels when the TV camera is in motion. This arrangement may replace the function of the resolution conversion circuit 18 or may be carried out together with the function of the resolution conversion circuit 18.

In the above embodiment, the case has been described in which the TV camera is moved from the operation panel on the reception or transmission side or by the object following method. However, the present invention can also be applied to the case in which the object itself moves. In that case, the amount of motion is monitored from the motion vector obtained by the movement compensation interframe prediction circuit 34. When a motion of a predetermined amount or above is detected, the low-resolution image which has been converted by the resolution conversion circuit 18 is in-frame compression coded and transmitted.

In the above embodiment, the amount of codes is reduced by reducing the resolution of the image data by means of the resolution conversion circuit 18. However, the present invention is not limited to this and the amount of entire codes may be reduced by increasing the quantization parameter of the quantization circuit 20 and thereby reducing the number of data which is output from the quantization circuit 20.

As will be readily understood from the foregoing description, in the above embodiment, the amount of codes is reduced when the image pick-up means is in motion or in other cases. Consequently, the in-frame compression factor can be substantially increased, and frame thinning can thus be restricted. This makes prevention of an awkward motion of the moving image caused by frame thinning out possible.

In the aforementioned embodiment, when the camera is moved, the resolution is reduced by averaging the data so as to prevent deterioration in the image quality which would be caused by the block distortion when data compression is performed.

A subsequent embodiment is designed to prevent deterioration in the image quality by changing the quantization step.

In the subsequent embodiment, the identical reference numerals are used to denote identical or similar elements to those shown in FIG. 1, description thereof being omitted.

Figure 5:
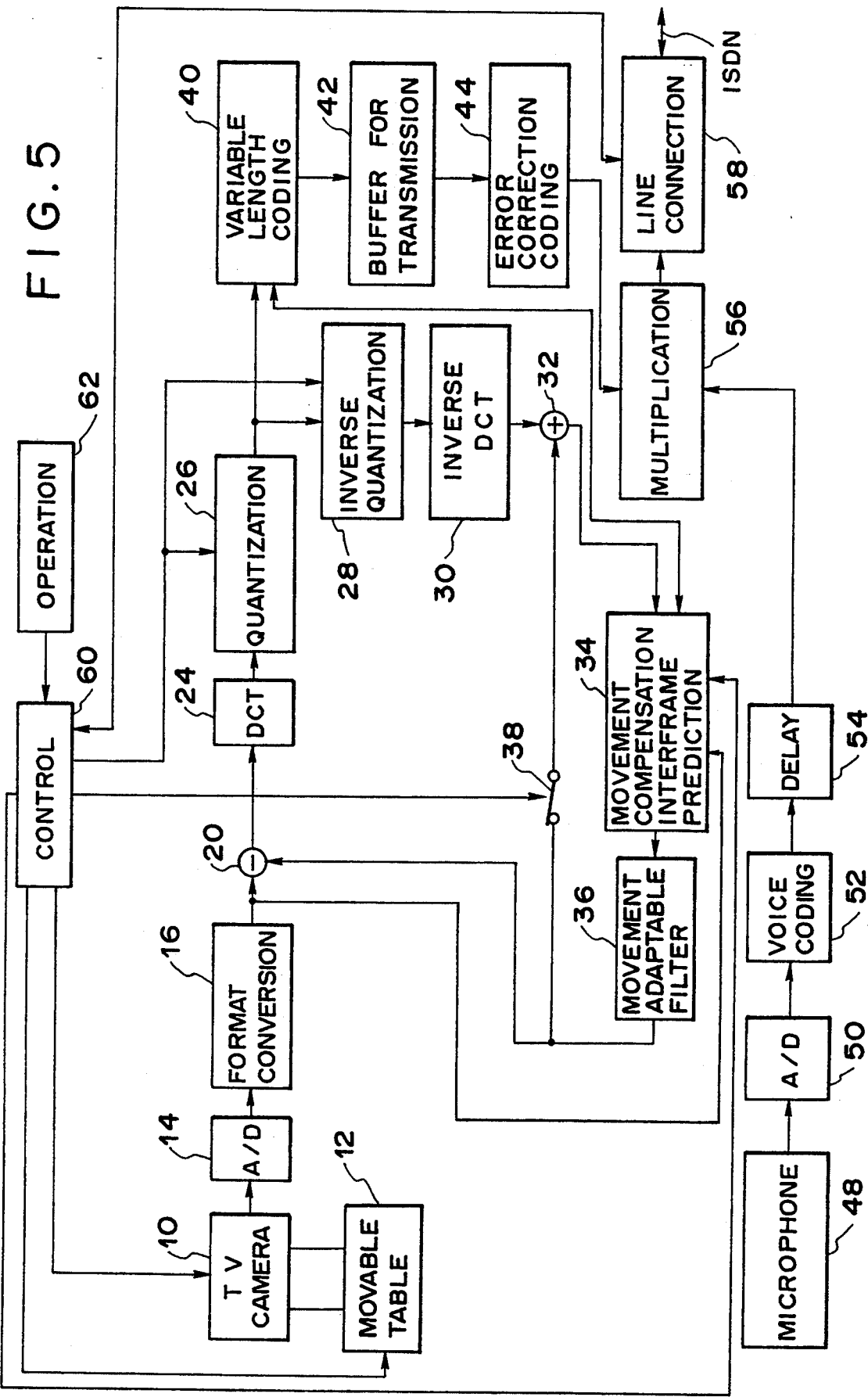
FIG. 5 is a block diagram of a terminal apparatus, illustrating a second embodiment of the present invention.

The embodiment shown in FIG. 5 differs from that shown in FIG. 1 in terms of the structure of a quantization circuit 26' and that of an inverse quantization circuit 28'.

Since the operation executed when the camera is stationary is the same as that executed in the aforementioned embodiment, description thereof is omitted.

When the TV camera 10 is in motion, the control circuit 60 opens the switch 38. Since the switch 38 is opened, the circuits 24 through 36 perform in-frame compression by DCT and detection of the motion vector.

The video signal output from the TV camera 10 is converted into a digital signal by the A/D converter 14, and the output of the A/D converter 14, having the raster format, is converted into a signal having a predetermined intermediate format for transmission by the format converting circuit 16. The output of the format converting circuit 16 is applied to the resolution converting circuit 18, the subtracter 20 and the movement compensation interframe prediction circuit 36. The DCT circuit 24 performs a DCT transform in every block consisting of 8×8 pixels, and outputs the coefficient of transform, and the quantization circuit 26 quantizes the coefficient of transform. In the quantization circuit 26, quantization is conducted on the coefficient of transformation $S_{ij}$ (i=1 through 8, j=1 through 8) obtained by conducting DCT on a block consisting of 8×8 pixels using a coding quantization table $Q_{ij}$ (i=1 through 8, j=1 through 8) and a quantization factor F.

Quantization is generally expressed by the following equation:

$$r_{ij}=S_{ij}/(Q_{ij}\times F/50)$$

where $r_{ij}$ is the quantized factor, $S_{ij}$ is the coefficient of transform obtained by DCT, $Q_{ij}$ is the coding and quantization table, and F is the quantization factor. As can be seen from the above equation, the compression factor provided by quantization can be increased by increasing the coding and quantization table $Q_{ij}$ or the quantization coefficient F.

FIGS. 6 and 7 respectively show examples of the coding and quantization table on the luminance which is normally used and of the coding and quantization table used when the camera is in motion. Generally, the compression factor for the coding by the quantization circuit 26' is increased by changing over the coding and quantization table shown in FIG. 6 to the coding and quantization table shown in FIG. 7 when the camera is moved.

The inverse quantization circuit 28' inversely quantizes the output of the quantization circuit 26, and the inverse DCT circuit 30 inversely DCT transforms the output of the inverse quantization circuit 28. The adder 32 outputs the output of the inverse DCT circuit 30 without changes, because the switch 38 is open. The output of the adder 32 is a locally decoded value of the code coded by the DCT circuit 24 and the quantization circuit 26. However, the movement compensation interframe prediction circuit 34 is controlled by the control circuit 60 such that the circuit 34 does not perform calculation of the motion vector. Thus, no motion vector is applied to the variable length coding circuit 40.

Thus, when the TV camera is moved, a higher compression factor for the compression coding conducted by the DCT circuit 24 and the quantization circuit 26 is achieved by changing over the quantization table used in the quantization circuit 26. Consequently, a predetermined compression factor can be achieved without frame thinning.

In the aforementioned embodiment, a higher compression factor is obtained by changing over the coding and quantization table in the quantization circuit 26 which is used when the camera is moved. However, it is also possible to obtain a higher compression factor by increasing the quantization factor used in the quantization circuit 26 when the camera is moved.

The case has been described in which the TV camera is moved from the operation panel on the reception or transmission side or by the object following method. However, the present invention can also be applied to the case in which the object itself moves. In that case, the amount of motion is monitored from the motion vector obtained by the movement compensation interframe prediction circuit 34. When a mot ion of a predetermined amount or above is detected, the low-resolution image which has been converted by the resolution conversion circuit 18 is in-frame compression coded and transmitted.

The aforementioned embodiment has the same advantages as those of the first embodiment.

During the scanning of the image pick-up means, frame correlation of the moving image obtained by the image pick-up means weakens, thus reducing the compression factor. Therefore, in order to restrict the amount of image data to be transmitted within a fixed capacity of the telecommunication line, thinning must often be performed.

The telecommunication capacity to be allocated to the image data can be increased by increasing the compression factor of the voice coding means and thereby reducing the amount of voice codes by means of the control means. Consequently, the frequency at which frame thinning occurs can be reduced and the awkwardness of the motion of the transmitted image can thus be restricted. An embodiment employing such a method will be described below.

Figure 8:
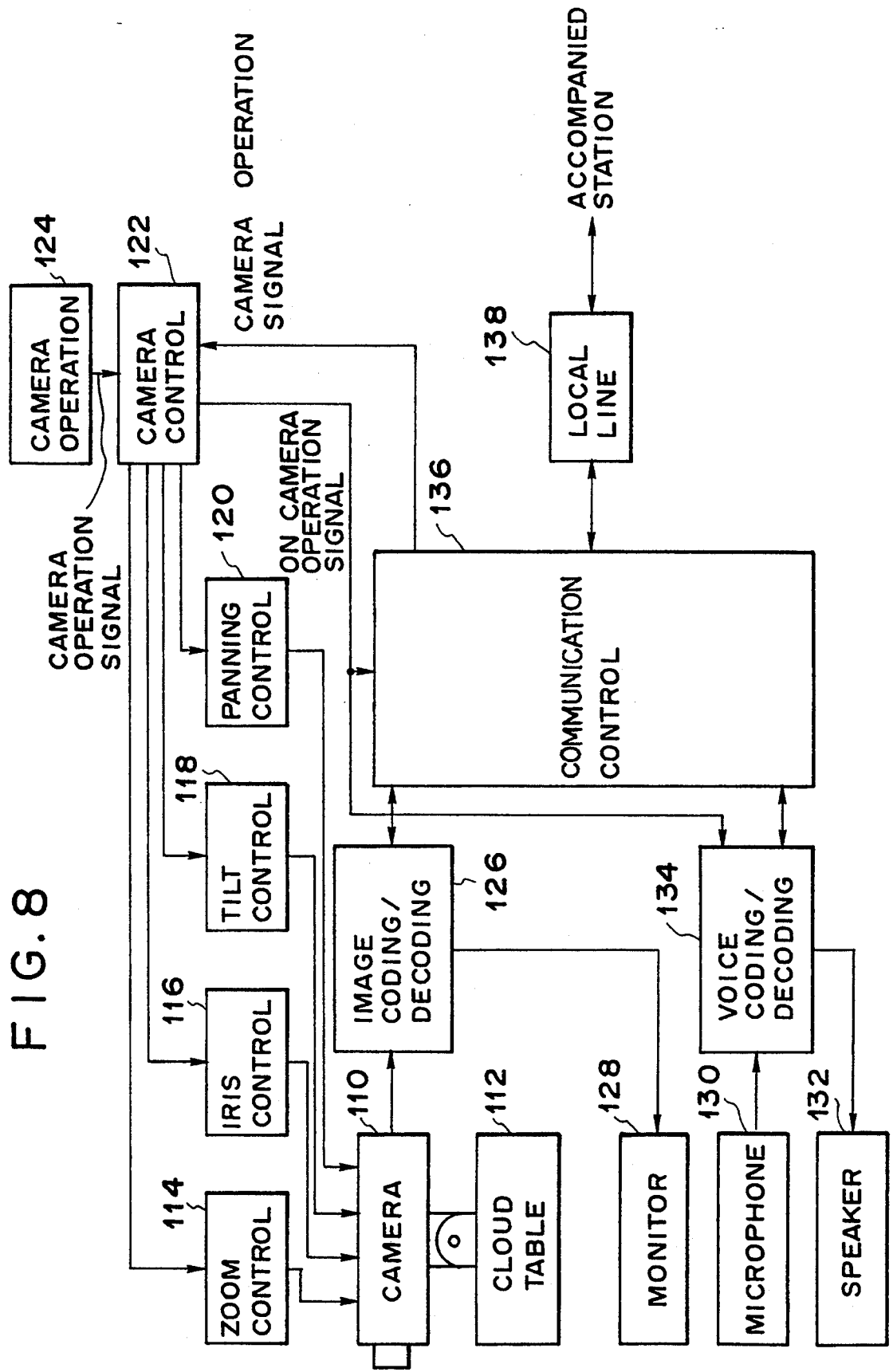
FIG. 8 is a schematic block diagram of a third embodiment of the present invention.

FIG. 8 is a schematic block diagram of a third embodiment of the present invention. In the figure, reference numeral 110 denotes a camera which converts the image of a conference participant into an electrical signal, the camera 110 being placed on a cloud table 112; 114 denotes a zoom control circuit for controlling zooming of a zoom lens of the camera 110; 116 denotes an iris control circuit for controlling the iris of the camera 110; 118 denotes a tilt control circuit for controlling tilting of the camera 110; 120 denotes a panning control circuit for controlling panning of the camera 110 through the cloud table 112 and 122 denotes a camera control circuit for controlling the camera 110 through the control circuits 114 through 120 in accordance with the camera operation signal sent from either a camera operation device 124 or a remote terminal.

Reference numeral 126 denotes a moving image coding/decoding circuit (codec) for coding/decoding a moving image; 128 denotes a monitor for displaying an image; 130 denotes a microphone for inputting a voice; 132 denotes a speaker for outputting a voice; and 134 denotes a voice coding/decoding circuit (codec) for coding/decoding a voice signal.

Reference numeral 136 denotes a communication control circuit for controlling communication with a local line 138. Although detailed description will be made later, the communication control circuit 136 packets a coded signal from the moving image coding/decoding circuit 126 or the voice coding circuit 134 at an externally controlled rate and outputs the packet to the local line 138. Also, the communication control circuit 136 decomposes the packet data from the other user, and distributes the image data, the voice data and the camera operation signal to the moving image coding/decoding circuit 126, the voice coding/decoding circuit 134 and the camera control circuit 122, respectively.

While the camera control circuit 122 is operating the camera 110 together with the cloud table 112 therefor) through the control circuits 114 through 120, it supplies a camera in-operation signal indicative of the camera being in operation to both the voice coding/decoding circuit 134 and the communication control circuit 136, whereby the circuits 134 and 136 reduces the amount of voice codes which are transmitted to the other user so as to increase the amount of image codes that can be transmitted.

Figure 9:
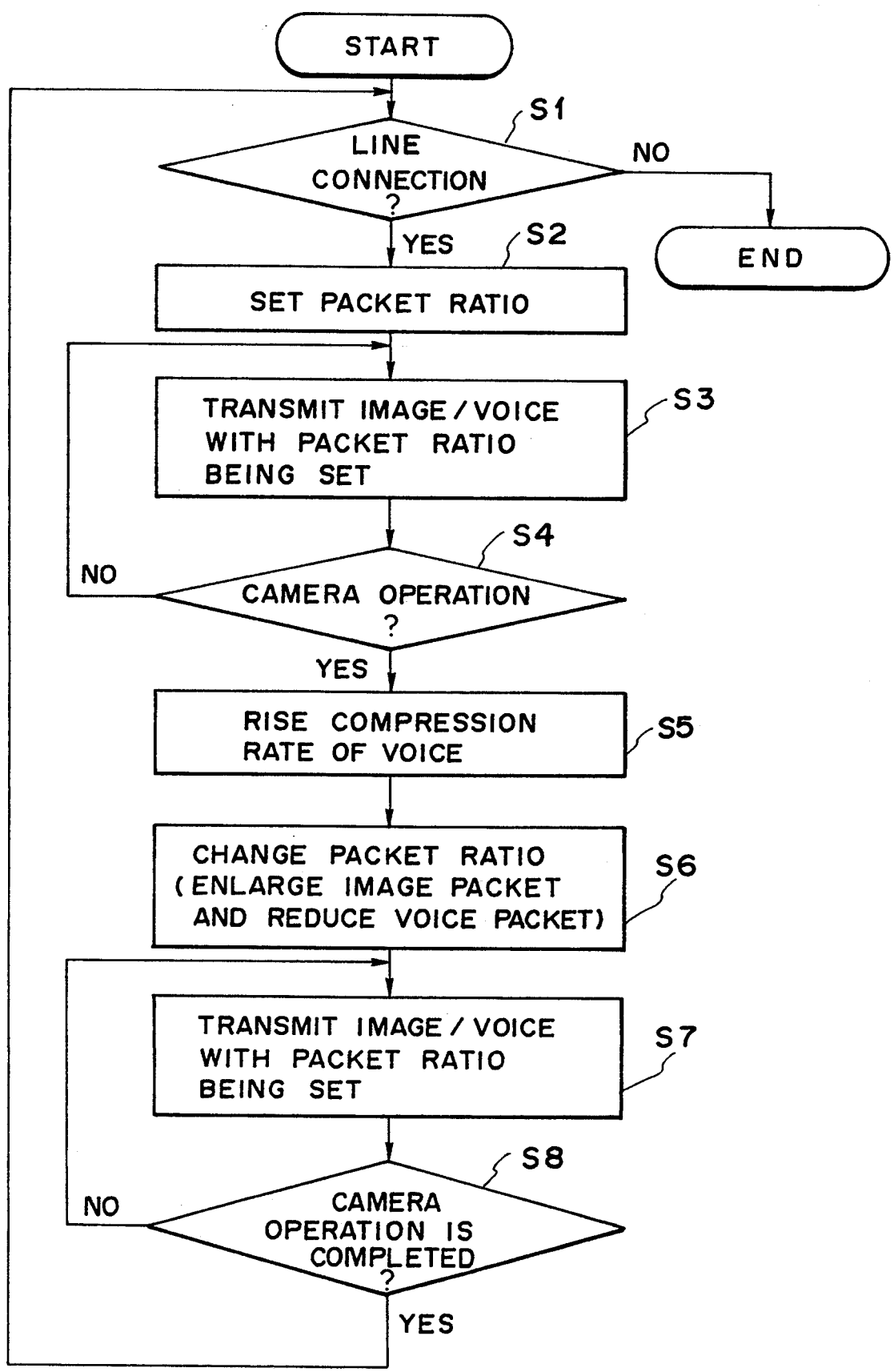
FIG. 9 is a flowchart of the operation of the third embodiment of the present invention.

The operation of this embodiment will be described below with reference to FIG. 9. First, line connection to the remove terminal is conducted (S1). Next, the packet ratio for the image data and that for the voice data on the communication line are set to initial values (S2).

The moving image coding/decoding circuit 126 compresses the image signal obtained by the camera 110 by the high efficient compression coding method and frame thinning, as mentioned above, and outputs the compressed coding signal to the communication control circuit 136. The voice coding/decoding circuit 134 compresses the voice signal from the microphone 130, and outputs the compressed signal to the communication control circuit 136. The communication control circuit 136 packets the image data from the image coding/decoding circuit 126 and the voice data from the voice coding/decoding circuit 134, and outputs them to the local line 138 at the packet ratios set in S2 (S3).

Assuming that the camera control circuit 122 has received the camera operation signal from either the camera control device 124 or the other user (S4), it controls the aperture, panning, tilting and zooming of the camera 110 (together with the cloud table 112) through the control circuits 114 through 120 in accordance with the operation contents of the camera operation signal. The camera control signal from the other user is input to the camera control circuit 122 through the local line 138 and the communication control circuit 136.

While the camera control circuit 122 is operating the camera 110 (together with the cloud table 112), it supplies the camera in-operation signal to the voice coding/decoding circuit 134 and the communication control circuit 136, whereby the voice coding/decoding circuit 134 increases the compression factor for the voice signal and thereby reduces the amount of output codes (S5) while the communication control circuit 136 allocates a larger capacity of the communication line to the image data, i.e., increases the packet ratio for the image data and reduces the packet ratio for the voice data (S6), and transmits the image data and voice data at these packet ratios (S7).

It is possible to cancel an increase in the amount of codes generated by the image coding/decoding circuit 126 during the operation of the camera and thereby restrict frame thinning by controlling the voice coding/decoding circuit 134 and the communication control circuit 136 in the manner described above. It is thus possible to restrict awkward motion of the transmitted images.

When control of the camera 110 (together with the cloud table 112) is completed (S8), the camera control circuit 122 suspends supply of the camera in-operation signal to the voice coding/decoding circuit 134 and the communication control circuit 136 to return both the voice compression factor in the voice coding/decoding circuit 134 and the composition factor for the image and voice data in the communication control circuit 136 to normal values used when the camera 110 (together with the cloud table 112) is not operated (S2, S3).

As will be understood from the foregoing description, in this embodiment, since a larger capacity of the communication line is allocated to the image data to be transmitted when the camera is operated, frame thinning is restricted, thus restricting the awkward motion of the transmitted image.

The present invention can be applied to a system including a plurality of devices or to a system including a single device.

The present invention can also be applied to the case in which a program is supplied to a system or an apparatus.

Furthermore, the present invention can be achieved by combining the techniques disclosed in the first, second and third embodiments.

What is claimed is:

1. An image processing apparatus comprising:

conversion means for converting an objective image into an image signal;

smoothing means for smoothing the image signal;

coding means for coding the image signal which has been smoothed by said smoothing means; and control means for controlling said smooth means to smooth the image signal in accordance with a converting state of said conversion means.

2. The image processing apparatus according to claim 1, wherein said converting state comprises a moving or a non-moving state of said conversion means.

3. The image processing apparatus according to claim 1, wherein said conversion means converts the objective image into a moving image signal.

4. The image processing apparatus according to claim 1, further comprising means for orthogonally transforming the image signal, and quantization means for quantizing the image signal which has been orthogonally transformed by said orthogonal transform means.

5. The image processing apparatus according to claim 4, wherein said control means further controls quantization characteristics of said quantization means in accordance with the converting state of said conversion means.

6. An apparatus comprising:

image pick-up means for outputting an image signal based on an object image; and compression means for in-frame or interframe compression coding an image signal output by said image pick-up means, a compression ratio of said compression means increasing when said image pick-up means is moved.

7. The apparatus according to claim 6, wherein said compression means gives the in-frame compression a priority when said image pick-up means is moved.

8. The apparatus according to claim 6, wherein said compression means performs compression coding using changed-over quantization characteristics for quantizing the image signal when said image pick-up means is moved.

9. The apparatus according to claim 6, wherein said compression means thins out the image signal of particular frames in the image signal to be transmitted when the amount of coded data obtained from the image signal input by said video input means is large.

10. The apparatus according to claim 6, wherein said compression means includes means for orthogonally transforming the image signal, and quantization means for quantizing the image signal which has been orthogonally transformed by said orthogonal transform means.

11. The apparatus according to claim 6, further comprising audio input means for inputting audio data.

12. The apparatus according to claim 11, further comprising audio input means for coding the audio data.

13. The apparatus according to claim 12, further comprising transmission means for transmitting the image signal which has been compressed by said compression means and the audio data which as been coded by said audio coding means.

14. An apparatus comprising:

image pick-up means for inputting a moving image;

image coding means for coding an image signal from said image pick-up means;

audio input means for inputting an audio;

audio coding means for coding an audio signal input by said audio input means;

output means for comprising a first coded data obtained by said image coding means and a second coded data obtained by said audio coding means and outputting the composite data; and control means for controlling a ratio of the first coded data and the second coded data in accordance with a change in an image pick-up range of said image pick-up means.

15. The apparatus according to claim 14, wherein said control means increases the ratio of the first coded data in accordance with the change in the image pick-up range.

16. The apparatus according to claim 14, wherein said image coding means includes means for orthogonally transforming the image signal, and quantization means for quantizing the image signal which has been orthogonally transformed by said orthogonal transform means.

17. The apparatus according to claim 14, wherein said output means comprises means for outputting the composite data to a communication line.

18. The apparatus according to claim 14, further comprising means for changing the image pick-up range of said image pick-up means.

19. The apparatus according to claim 18, wherein said changing means pans said image pick-up means over the image pick-up range.

* * * * *

UNITED STATES PATENT AND TRADEMARK OFFICE
CERTIFICATE OF CORRECTION

PATENT NO. : 5,357,281
DATED : October 18, 1994
INVENTOR(S) : KEIICHI IKEDA, ET AL.

It is certified that error appears in the above-identified patent and that said Letters Patent is hereby corrected as shown below:

COLUMN 4

Line 19, "switch" should read --switch 22--.
Line 23, "filter 38)," should read --filter 36),-- and "and the" should read --from the output of format converting circuit 16, and--.

COLUMN 7

Line 15, "circuit 20" should read --circuit 26--.
Line 17, "circuit 20." should read --circuit 26.--.

COLUMN 11

Line 6, "smooth" should read --smoothing--.

COLUMN 12

Line 7, "input" should read --coding--.
Line 17, "audio" should read --audio signal--. (second occurrence)

Signed and Sealed this

Fourteenth Day of February, 1995

Attest:

BRUCE LEHMAN

Attesting Officer

Commissioner of Patents and Trademarks